United States Patent [19]
Edwards

[11] 3,992,861
[45] Nov. 23, 1976

[54] CROP HARVESTING APPARATUS

[75] Inventor: John W. Edwards, Wauchula, Fla.

[73] Assignee: Ginny Bee Harvester Corporation, Tampa, Fla.

[22] Filed: Oct. 26, 1973

[21] Appl. No.: 410,262

Related U.S. Application Data

[63] Continuation-in-part of Ser. No. 386,421, Aug. 7, 1973, abandoned, which is a continuation-in-part of Ser. No. 362,453, May 21, 1973, abandoned, which is a continuation-in-part of Ser. No. 350,168, April 11, 1973, abandoned, which is a continuation-in-part of Ser. No. 339,914, March 9, 1973, abandoned.

[52] U.S. Cl. .................................. 56/328 R; 56/128
[51] Int. Cl.[2] .......................................... A01D 46/00
[58] Field of Search .............. 56/328 R, 327 R, 330, 56/167, 128–130; 171/14, 28, 92, 119, 123; 130/27 AE; 280/6 R, 6 H; 180/39, 41

[56] References Cited

UNITED STATES PATENTS

| | | | |
|---|---|---|---|
| 878,285 | 2/1908 | Heimburger | 171/14 |
| 1,975,668 | 10/1934 | Rodin | 171/14 |
| 2,094,345 | 9/1937 | Bootes | 56/238 X |
| 2,520,266 | 8/1950 | Adams | 56/209 X |
| 2,696,706 | 12/1954 | Getsinger | 56/330 |
| 2,756,062 | 7/1956 | Thixton | 56/209 X |
| 2,777,274 | 1/1957 | Beaumont | 56/249 |
| 2,783,605 | 3/1957 | Heleen | 56/330 |
| 3,412,542 | 11/1968 | Kenton | 56/328 R |
| 3,421,304 | 1/1969 | Phillips, Sr. | 56/328 R |
| 3,485,026 | 12/1969 | Davis | 56/328 R |
| 3,530,654 | 9/1970 | Staats, Sr. et al. | 56/328 R |
| 3,537,245 | 11/1970 | Smith | 56/328 R |
| 3,561,205 | 2/1971 | Baker | 56/328 R |
| 3,672,140 | 6/1972 | Furford | 56/330 |

*Primary Examiner*—Russell R. Kinsey
*Attorney, Agent, or Firm*—Morton, Bernard, Brown, Roberts & Sutherland

[57] ABSTRACT

A crop harvesting apparatus particularly suited for harvesting fruit and nuts from crop-bearing trees. A plurality of crop severing devices are mounted on rotatable drive shafts. The crop severing devices can take any of several forms. In one illustrative form of the present invention, the crop severing devices can be arcuate members mounted on a drive shaft by two or more support members such as support discs, with each arcuate member including a crop engaging portion and a crop passage portion terminating in a crop severing edge. Alternatively, the crop severing devices can be one or more crop severing rods mounted onto a drive shaft by support members, with the crop severing rods straight, slightly spiralled or wavy in configuration. As another alternative, the crop severing devices can include a first set of foliage-lifting rods mounted for rotation at a first speed and a second set of crop-severing rods mounted for rotation at a second speed, for example faster than the first speed, with the foliage-lifting rods spaced outwardly of the crop severing rods so that the slower rotating foliage-lifting rods lift branches, immature crops, and other foliage while the mature crops hang down to be severed by the crop severing rods. The crop severing rods and the foliage-lifting rods can be mounted on coaxial drive shafts or on drive shafts that are not coaxial. The crop severing rods can be mounted to their drive shaft by support discs, rods, cylinders or endless belts. Thus, as a crop severing device of the present invention is rotated in a crop-bearing plant, mature crops are engaged and severed from the plants, while, because of their relatively light weight, immature, green crops and foliage are not engaged sufficiently to be severed.

67 Claims, 31 Drawing Figures

FIG.1
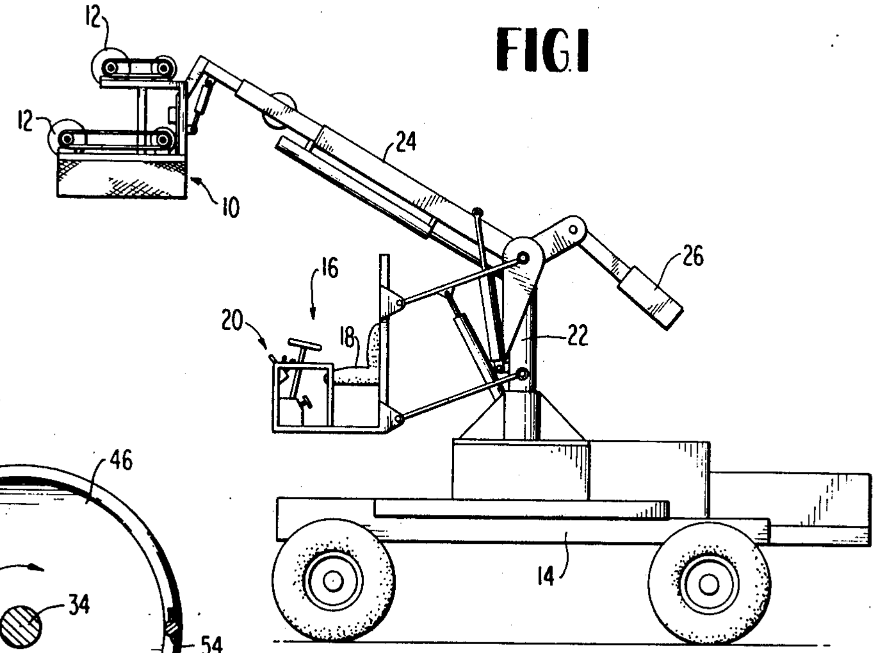
FIG.4
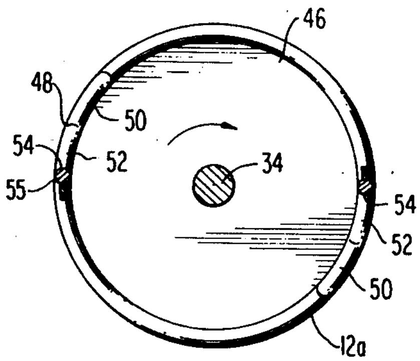
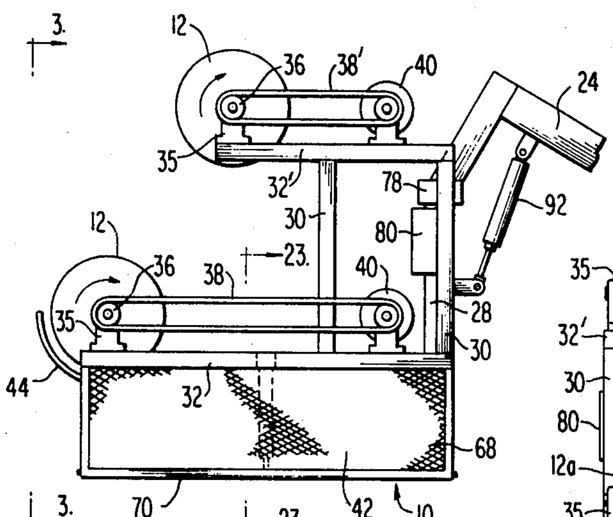
FIG.2
FIG.3
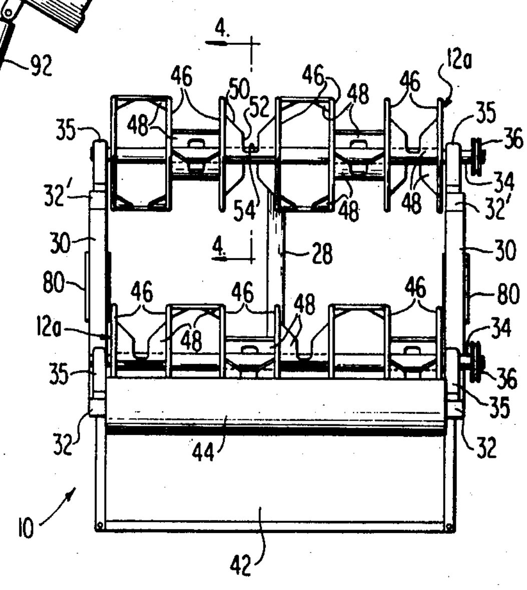

FIG. 23
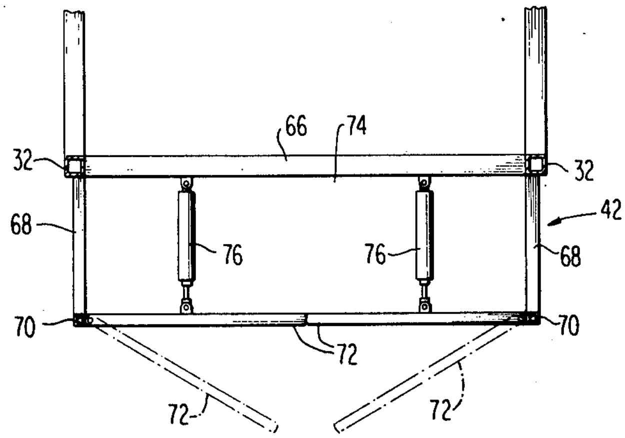
FIG. 5
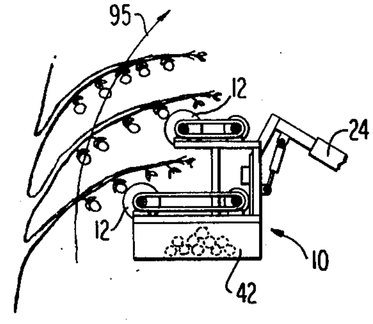
FIG. 6
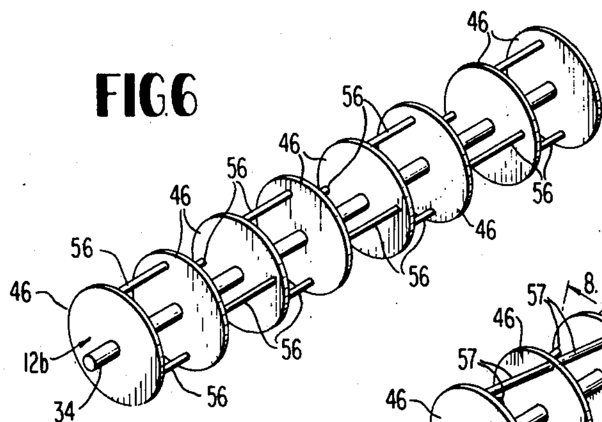
FIG. 7
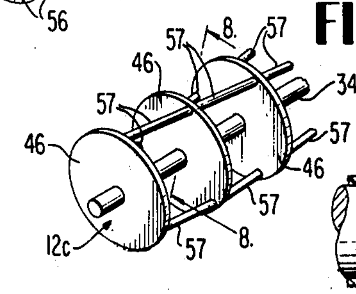
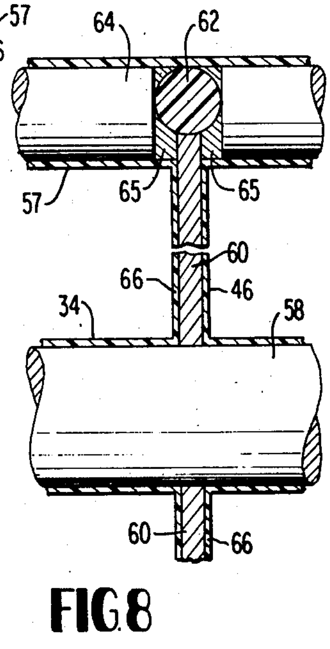
FIG. 8
FIG. 24
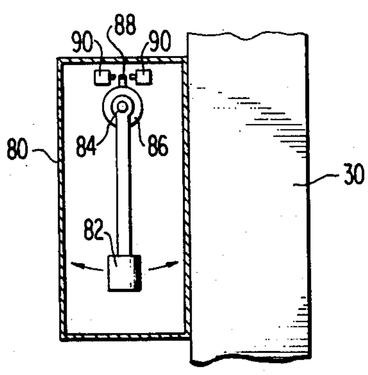

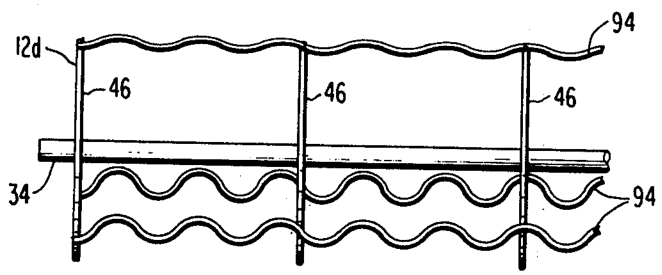
FIG.9
FIG.10
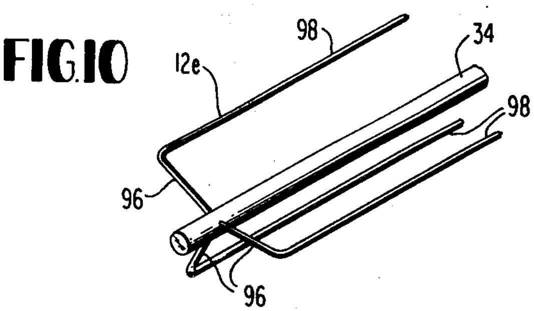
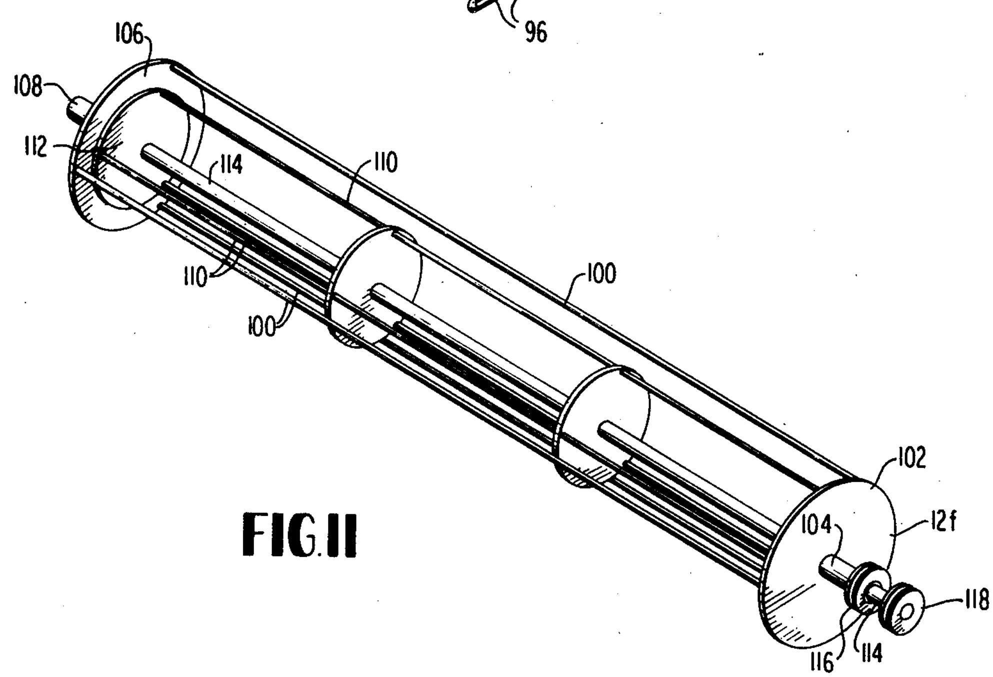
FIG.11

FIG.22
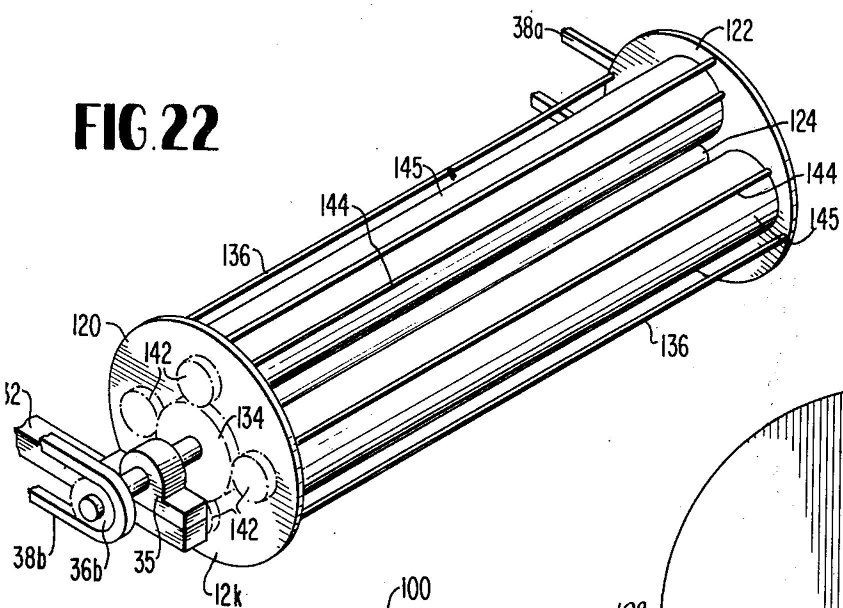
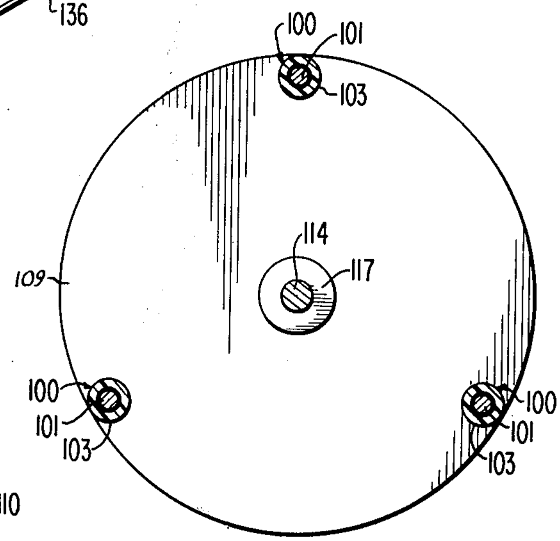
FIG.14
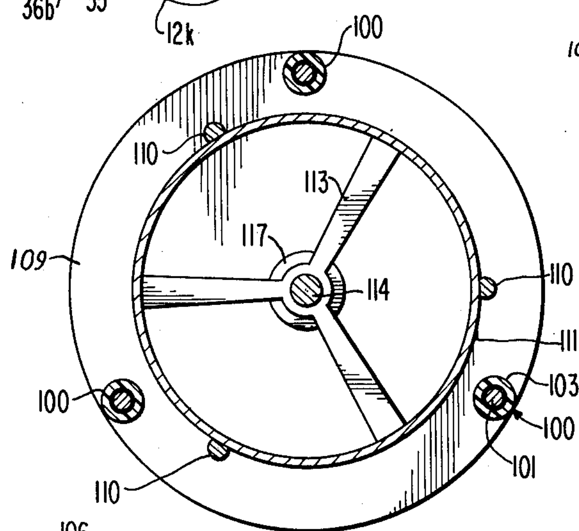
FIG.15
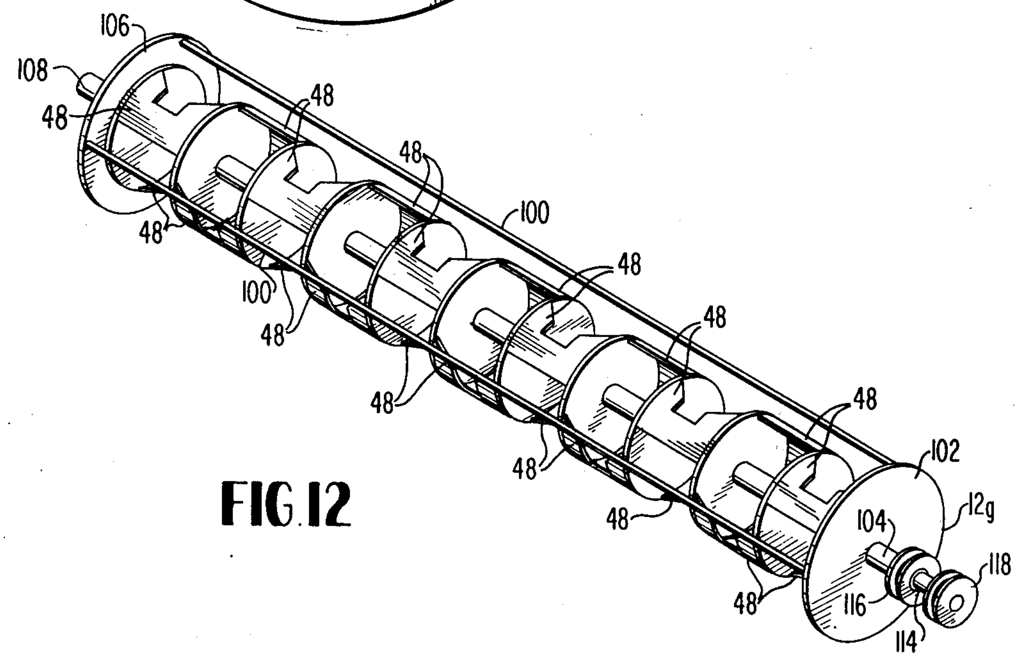
FIG.12

FIG. 20
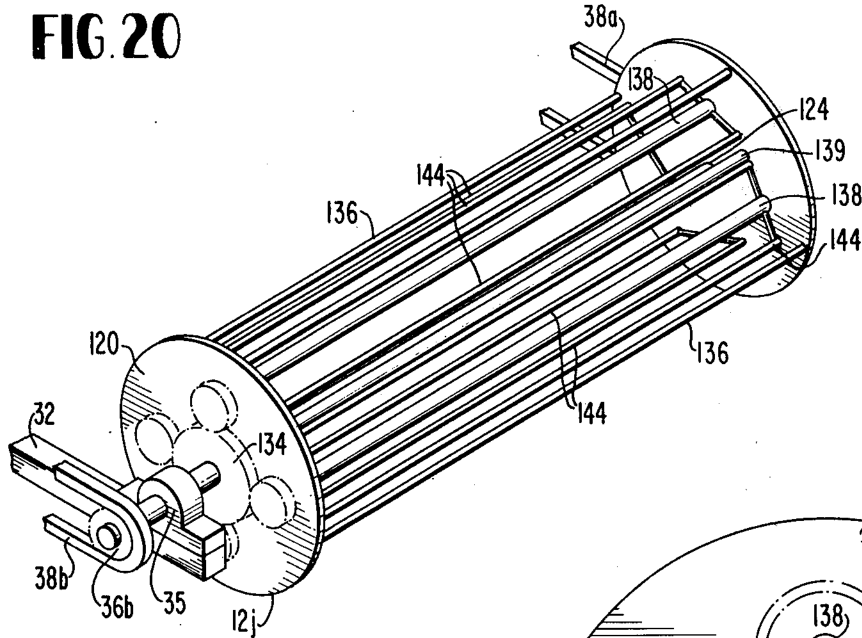
FIG. 21
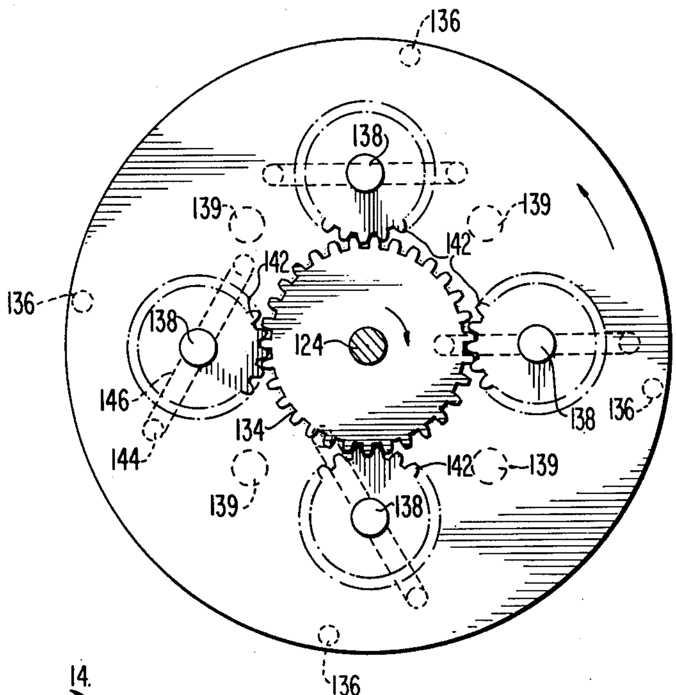
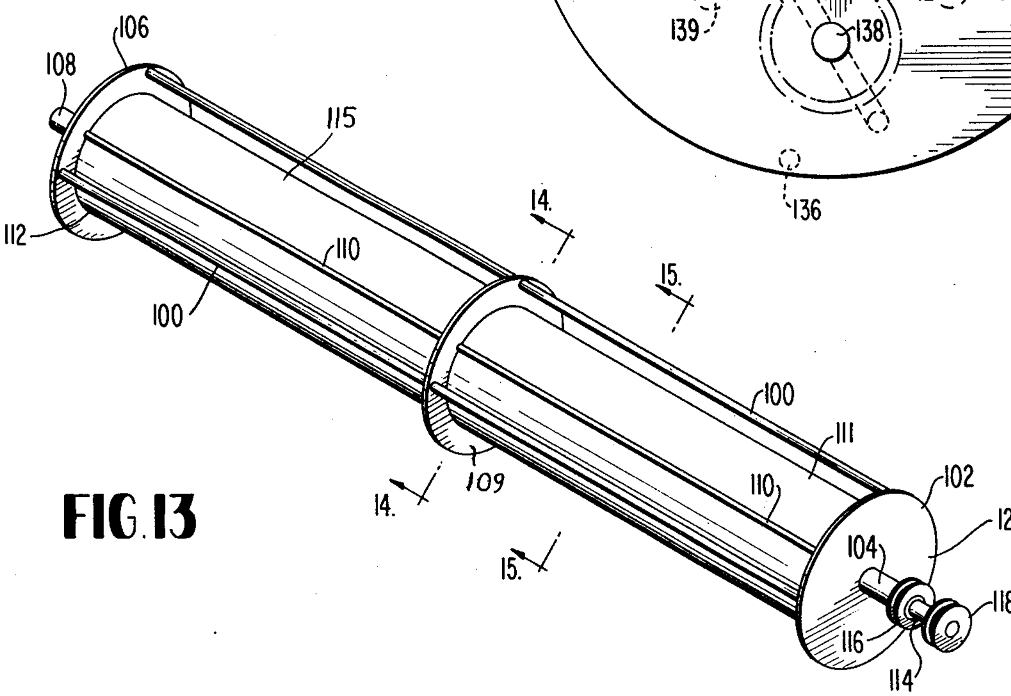
FIG. 13

FIG.16
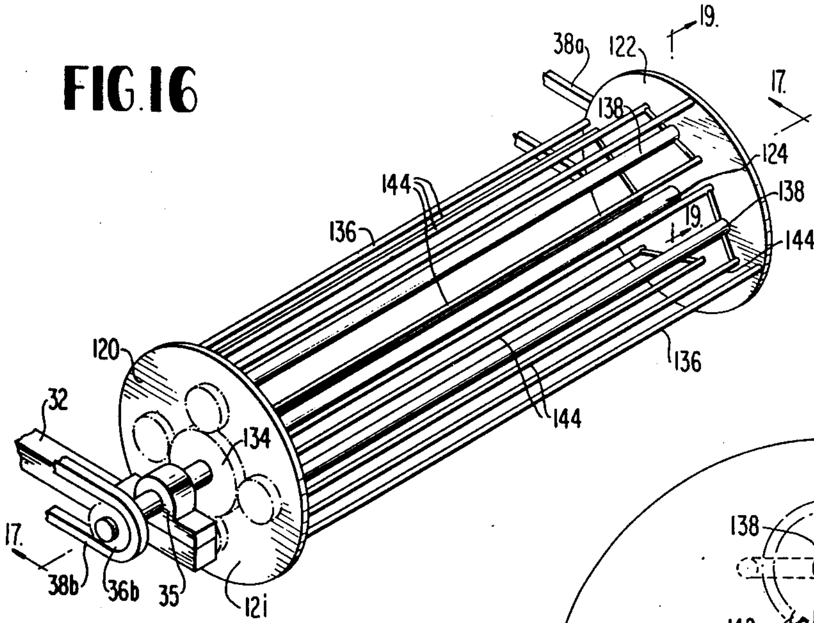
FIG.18
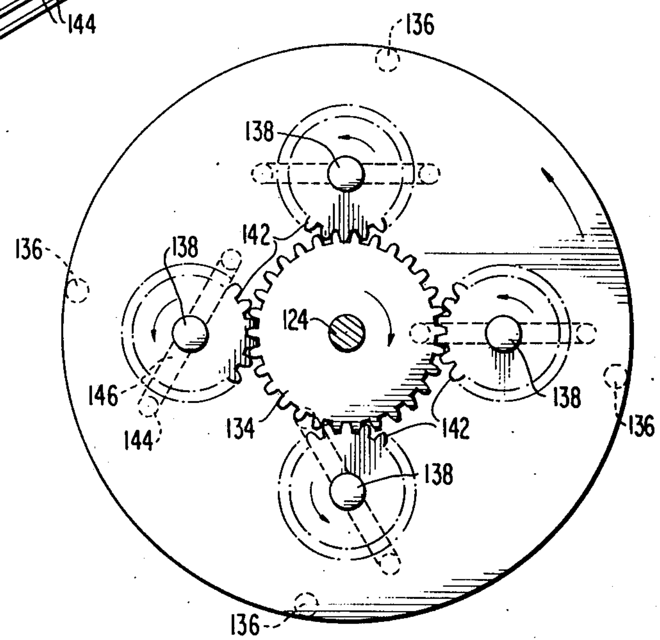
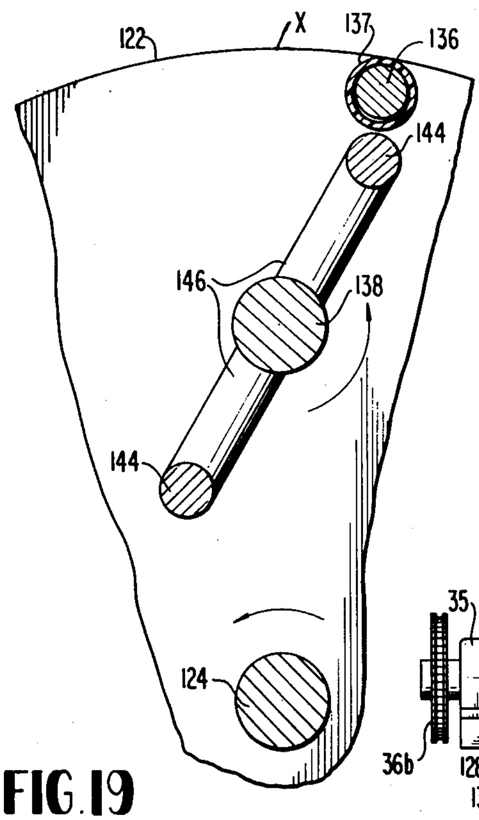
FIG.19
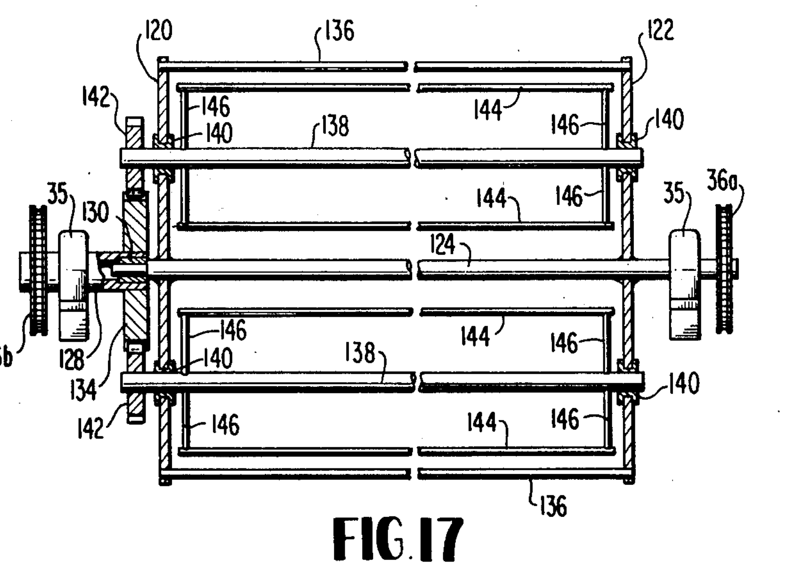
FIG.17

CROP HARVESTING APPARATUS

This application is a continuation-in-part of U.S. patent application Ser. No. 386,421, filed Aug. 7, 1973, and now abandoned which is a continuation-in-part of U.S. patent application Ser. No. 362,453, filed May 21, 1973 and now abandoned. This latter application, in turn, is a continuation-in-part of U.S. patent application Ser. No. 350,168, filed Apr. 11, 1973, and now abandoned, which is a continuation-in-part of U.S. patent application Ser. No. 339,914, filed Mar. 9, 1973, and now abandoned.

The present invention pertains to a crop harvesting apparatus. More particularly, the present invention pertains to an automated apparatus for the mechanized harvesting of crops and, in particular, tree-borne crops such as fuit, nuts and the like.

At the present time, many tree-borne crops such as fruit and nuts are harvested by hand. While attempts have been made to perfect mechanized crop harvesting apparatus, these have not been wholly successful heretofore. Many such apparatus either have caused damage to the crop-bearing plant or to the crop itself, or they have been unable to pick crops with great enough efficiency to be economically successful. Fruit trees must not be damaged to any extent during the harvesting of the fruit, or the tree will yield less fruit in subsequent crops. Thus, mechanized fruit harvesting apparatus must be capable of removing the fruit from the tree without removing an excessive quantity of leaves and branches. Removal of even a small quantity of leaves and branches is undesirable, even though that may not cause appreciable damage to the tree, since such leaves and branches must be removed from among the fruit before marketing. Likewise, the fruit itself must not be damaged to any great extent if it is to be marketable. While fruit which is intended for processing need not be in perfect condition, still it cannot be damaged excessively or it will be unsuited even for processing. Accordingly, the fruit harvesting must be done without excessive damage to the crop. Citrus fruit of the Valencia variety must stay on the tree for over a year to ripen. As a consequence, at the time the fruit is to be harvested, the Valencia fruit tree is bearing both unripened or green fruit of the new crop and ripened fruit of the crop to be harvested. An automatic crop harvesting apparatus must be capable of picking the ripened Valencia fruit while leaving the unripened fruit.

U.S. Pat. No. 3,646,741, issued Mar. 7, 1972 to John W. Edwards et al., discloses a crop harvesting apparatus overcoming many of the problems of prior crop harvesting devices. The apparatus disclosed in that patent includes an elongated hollow cylindrical shell with a plurality of crop-entry openings for the entry of the crop such as fruit and nuts, with each opening terminating in a crop severing edge. The shell is thrust lengthwise among the crops and rotated, removing crops from the plants. Each crop-entry opening is provided with a closure or door to prevent mature, ripened fruit from leaving the shell via the crop-entry opening, while permitting immature, green fruit, leaves and branches to pass out the crop-entry opening without being severed from the plant. Although the apparatus disclosed in U.S. Pat. No. 3,646,741 performs better than previously available mechanized crop harvesting devices, still shortcomings exist. The closures or doors on the crop-entry openings slow operation of the apparatus. While the apparatus does not remove so many leaves from the trees as to cause appreciable damage to the trees, still some leaves are removed and mixed with the harvested crops. This necessitates separating these leaves from the crops before marketing of the crops.

The present invention is a crop harvesting apparatus, particularly suited for the picking of tree-borne crops such as fruit and nuts, and without shortcomings found in the apparatus of U.S. Pat. No. 3,646,741. In accordance with the present invention, a crop harvesting apparatus is provided including a rotatable drive shaft and crop severing means mounted to the rotatable drive shaft for rotation therewith. In one aspect of the present invention, the crop severing means comprise a plurality of arcuate crop severing members, each having a crop engaging portion and a crop passage portion with a crop severing edge. In another aspect of the present invention, the crop severing means comprise one or more crop severing rods mounted to the rotatable drive shaft for rotation therewith to engage and sever crops as the apparatus is rotated in a crop-bearing plant. In one embodiment of this aspect of the present invention, the rotatable drive shaft has a plurality of support members such as discs mounted on it, with a plurality of rods joining each pair of adjacent discs and connecting to the discs adjacent the peripheries thereof. Preferably, rather than being aligned, the rods joining adjacent pairs of discs are staggered about the perimeter of the discs, for example at 90° intervals, or by spiralling, rather than being aligned. As the apparatus is rotated in a crop-bearing plant, for example an orange tree, the crops, such as oranges, are engaged by the rods and severed from the plants. The apparatus of this embodiment is particularly advantageous for harvesting fresh fruit from trees. By way of example, in the harvesting of oranges, the fruit is heavy enough to be engaged by the rods sufficiently to be severed from the tree, while the foliage is so light that it is not engaged sufficiently to be severed.

In another embodiment of this aspect of the present invention, a first set of one or more foliage-lifting rods are mounted for rotation at a first speed, and a second set of one or more crop-severing rods are mounted for rotation at a second speed, preferably faster than the first speed. The slower rotating foliage-lifting rods are spaced outwardly of the faster rotating crop-severing rods. Consequently, the foliage-lifting rods raise branches and other foliage, including on a Valencia orange tree the green, immature fruit of the new crop, while the mature fruit hangs within these slower rotating rods to be contacted and severed by the faster rotating crop-severing rods. The crop-severing rods can be mounted on a single drive shaft coaxial with the drive shaft of the foliage-lifting rods or on a plurality of drive shafts spaced from the drive shaft of the foliage-lifting rods. The crop-severing rods can be mounted to their drive shaft by discs to which the rods are attached or by cylinders on the outer surface of which the rods attach. As another embodiment of the invention arcuate crop severing members can be mounted for rotation within the area of rotation of slower rotating foliage-lifting rods. In yet another embodiment, crop severing rods are mounted on an endless belt which moves within foliage lifting rods mounted on endless chains surrounding the endless belt. The apparatus of the present invention can thus be utilized to harvest nuts and fruit, including citrus fruit, and particularly including citrus fruit of the Valencia variety which has the crops of two seasons on the tree at the time the mature ripened fruit is to be harvested, without harvesting the immature green fruit and without severing foliage which otherwise would have to be separated from the harvested fruit before marketing of the fruit.

Preferably, the crop harvesting apparatus of the present invention is thrust into the crop-bearing plant with the rotatable drive shaft longitudinal axis transverse the direction of thrust. The apparatus is then rotated and moved inwardly, upwardly, and outwardly through the plant in an arcuate path. Consequently, low-lying branches, which often are near or touching the ground, are lifted by the apparatus as the drive shaft rotates, permitting the harvesting of crops from their undersides.

These and other aspects and advantages of the present invention are more apparent in the following detailed description and claims, particularly when considered in conjunction with the accompanying drawings in which like parts bear like reference numerals. In the drawings:

FIG. 1 is a side elevational view of crop harvesting apparatus in accordance with the present invention mounted on a suitable vehicle ready for the harvesting of tree-borne crops;

FIG. 2 is an enlarged fragmentary side elevational view showing the crop harvesting apparatus of FIG. 1;

FIG. 3 is a front elevational view taken along line 3—3 of FIG. 2 and depicting a first embodiment of crop harvesting apparatus in accordance with the present invention;

FIG. 4 is an enlarged sectional view taken along line 4—4 of FIG. 3;

FIG. 5 is a fragmentary side elevational view depicting the harvesting of crops with a crop harvesting apparatus in accordance with the present inventon.

FIG. 6 is a perspective view of a second embodiment of crop harvesting apparatus in accordance with the present invention;

FIG. 7 is a fragmentary perspective view of another embodiment of crop harvesting apparatus in accordance with the present invention;

FIG. 8 is an enlarged broken sectional view taken along line 8—8 of FIG. 7;

FIG. 9 is a fragmentary elevational view of another embodiment of crop harvesting apparatus in accordance with the present invention;

FIG. 10 is a fragmentary perspective view of still another embodiment of crop harvesting apparatus in accordance with the present invention;

FIG. 11 is a perspective view of yet another embodiment of crop harvesting apparatus in accordance with the present invention;

FIG. 12 is a perspective view of another embodiment of crop harvesting apparatus in accordance with the present invention;

FIG. 13 is a perspective view of still another embodiment of crop harvesting apparatus in accordance with the present invention;

FIG. 14 is an enlarged sectional view taken along line 14—14 of FIG. 13;

FIG. 15 is an enlarged sectional view taken along line 15—15 of FIG. 13;

FIG. 16 is a perspective view of a further embodiment of crop harvesting apparatus in accordance with the present invention;

FIG. 17 is an enlarged broken sectional view taken along line 17—17 of FIG. 16.

Figure 25:
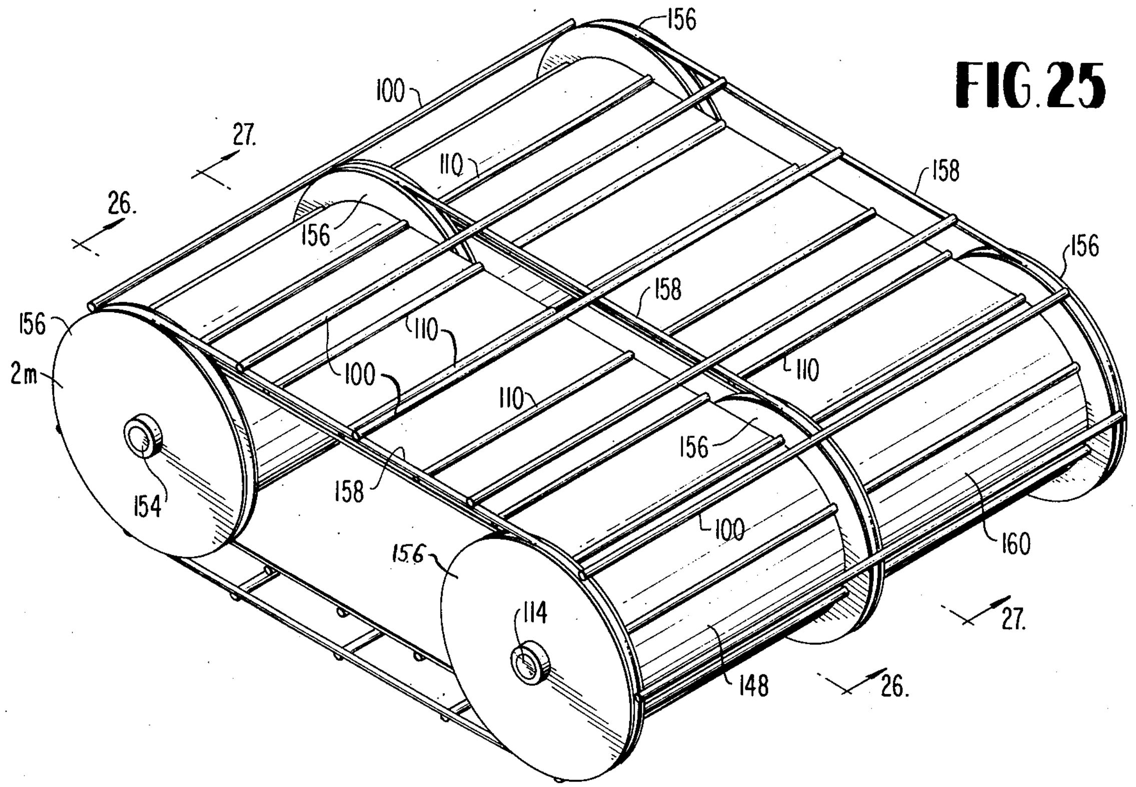
Figure 26:
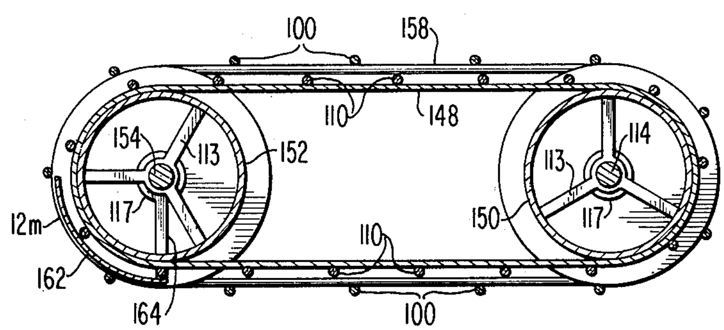
Figure 27:
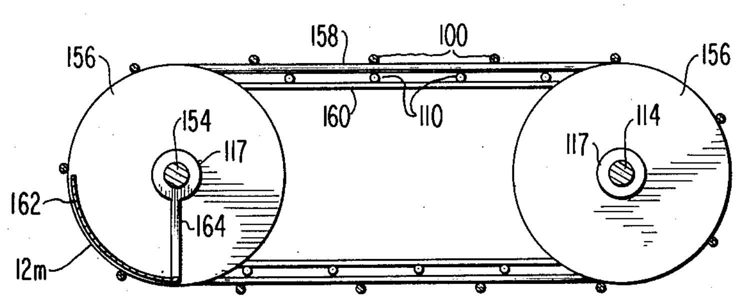
Figure 28:
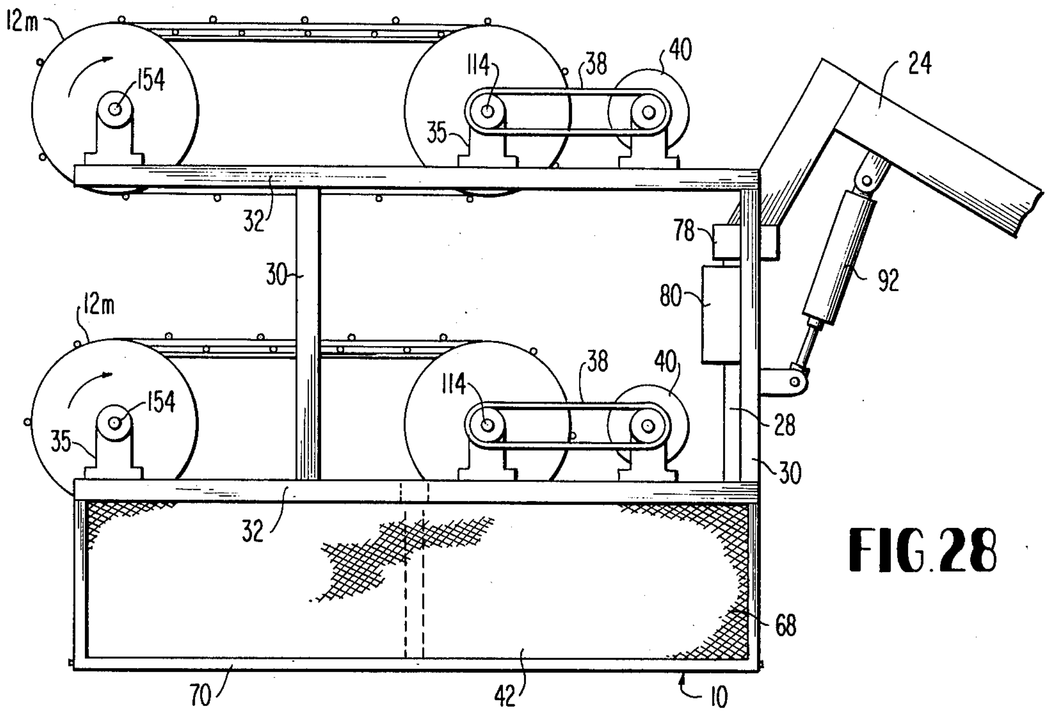
Figure 31:
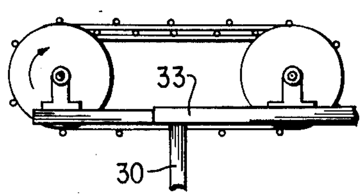
Figure 30:
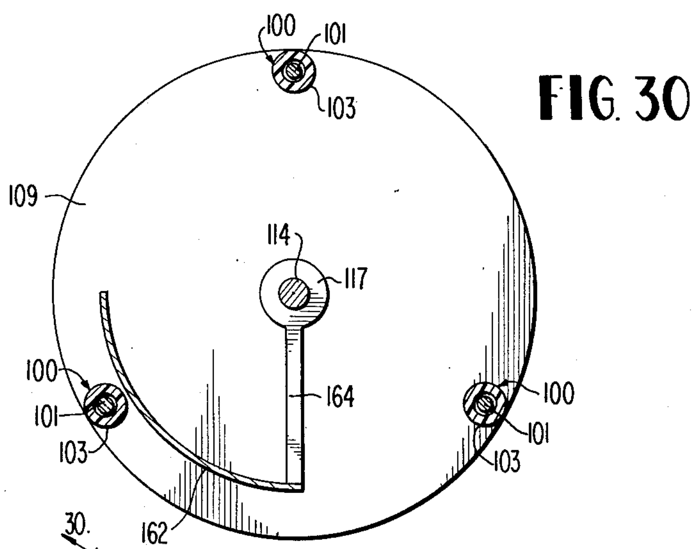
Figure 29:
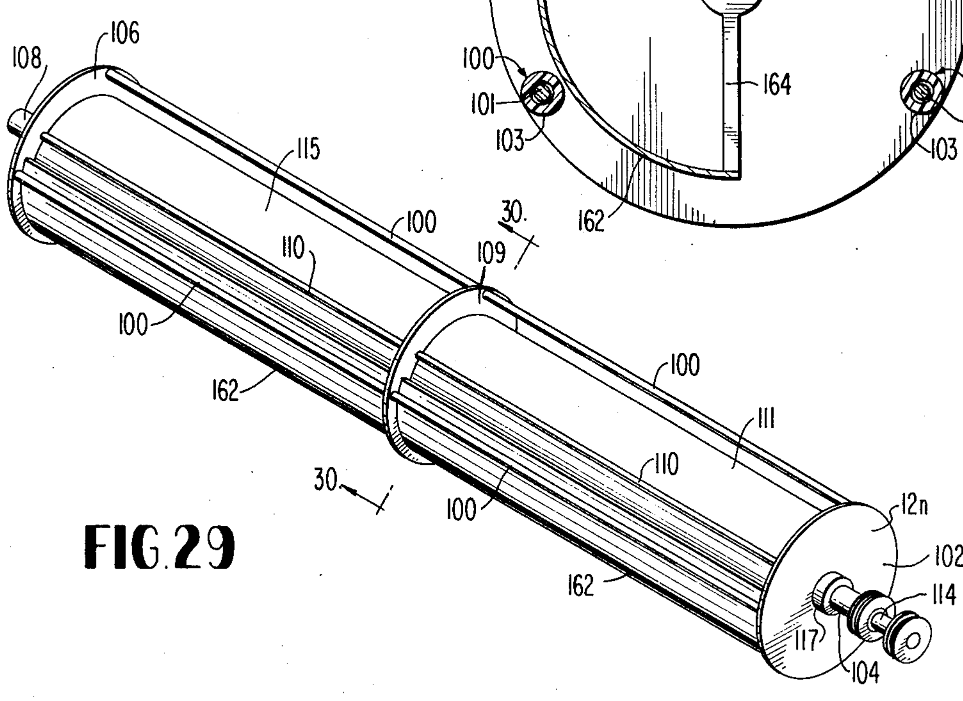

FIG. 18 enlarged elevational view of an end plate of the embodiment of FIG. 16 showing a drive arrangement;

FIG. 19 is an enlarged fragmentary sectional view taken along line 19—19 of FIG. 16;

FIG. 20 is a perspective view of yet another embodiment of crop harvesting apparatus in accordance with the present invention;

FIG. 21 is an enlarged elevational view of an end plate of the embodiment of FIG. 20;

FIG. 22 is a perspective view of another embodiment of crop harvesting apparatus in accordance with the present invention;

FIG. 23 is an enlarged sectional view taken along line 23—23 of FIG. 2;

FIG. 24 is an enlarged fragmentary, partially sectional view of a leveling device suitable for use in conjunction with a crop harvesting apparatus in accordance with the present invention;

FIG. 25 is an enlarged perspective view of a further embodiment of crop harvesting apparatus in accordance with the present invention;

FIG. 26 is a sectional view taken along line 26—26 of FIG. 25;

FIG. 27 is a sectional view taken along line 27—27 of FIG. 25;

FIG. 28 is an enlarged fragmentary side elevational view showing the mounting of the crop harvesting apparatus of FIG. 25;

FIG. 29 is a perspective view of still another embodiment of crop harvesting apparatus in accordance with the present invention;

FIG. 30 is an enlarged sectional view taken along line 30—30 of FIG. 29; and FIG. 31 is a reduced fragmentary side elevation view illustrating a modified mounting of a crop harvesting apparatus in accordance with the present invention.

FIG. 1 depicts a support station 10 including two crop harvesting apparatus 12 in accordance with the present invention and mounted on a self-propelled vehicle 14 for the harvesting of crops. Vehicle 14 can be any suitable vehicle for propelling the crop harvesting apparatus 12 through the crop-bearing plants, and the details of vehicle 14 are not critical to the present invention. For purposes of illustration, a vehicle 14 is depicted including an operator station 16 having a seat 18 and a control panel 20, with controls not only permitting control of the operation of crop harvesting apparatus 12, but also permitting control of the movement of vehicle 14 through the crop-bearing plants. In the illustrative showing of FIG. 1, a pedestal 22 is mounted on vehicle 14 to support an extendible boom 24 from the end of which the support station 10 is mounted. If necessary, a counterweight 26 can be provided to assure stability of the overall device. Boom 24 is preferably capable of rotation in a horizontal plane about the axis of pedestal 22 and in a vertical plane about a horizontal axis at the upper end of pedestal 22. Illustratively, boom 24 might be capable of telescoping, for example to a length in the order of 32 feet. Control panel 20 might include controls to move vehicle 14 forward and backward and to steer the vehicle, as well as controls to move boom 24 up or down, right or left, and in or out.

FIGS. 2 and 3 depict support station 10 in enlared views, with FIG. 3 illustrating a first embodiment of crop harvesting apparatus 12*a*. Rear support member 28 pivotly supports station 10 from the end of boom 24.

Support station 10 includes vertical frame members 30 and horizontal frame members 32, 32'. In the illustrative showing of the drawings a first crop harvesting apparatus 12 is supported by lower horizontal frame members 32, while a second crop harvesting apparatus 12 is supported by upper horizontal frame members 32', slightly to the rear of the lower crop harvesting apparatus. Each crop harvesting apparatus 12 includes an enlongated rotatable drive shaft 34, rotatably mounted by mounting members 35 from the respective horizontal frame members 32, 32', and crop severing means. Each rotatable drive shaft 34 has at one end a drive means such as a pulley 36 coupled by a belt 38, 38' to drive motor 40. The drive motors 40 can be any suitable motors such as electric, hydraulic or pneumatic motors. The power source for the motors 40 can be mounted on vehicle 14 with controls included on control panel 20. Each motor 40 drives its associated crop harvesting apparatus 12 in a clockwise manner in the view depicted in FIG. 2. A crop catching basket 42 is mounted to catch fruit harvested from a fruit-bearing tree by the crop harvesting apparatus 12. Preferably, a shield 44 extends outwardly from the front of basket 42 beneath a portion of the lower crop harvesting apparatus 12 to insure that crops harvested by that crop harvesting apparatus are not dropped outside basket 42.

FIGS. 3 and 4 depict one embodiment of crop harvesting apparatus **12*a* in accordance with the present invention. A plurality of support members such as discs 46 are mounted on rotatable drive shaft 34, spaced at intervals. Two arcuate crop severing members 48 join each pair of adjacent discs 46, on or adjacent the peripheries of the discs, as seen in FIGS. 3 and 4. Each arcuate crop severing member 48 includes a crop engaging portion 50 and a crop passage portion 52 which terminates in a crop severing edge 54. As shown in FIG. 3, the crop engaging portion 50 and the crop passage portion 52 of each arcuate crop severing member 48 define a Y, with the crop engaging portion 50 tapering from a width defined by the spacing of the discs 46 to the more narrow width of the crop passage portion 52. Illustratively, discs 46 might be 16 gauge steel discs of a diameter in the order of 15 inches, and arcuate crop severing members 48 might also be 16 gauge steel. In such case, a reinforcing member 55, such as a one-fourth inch steel rod, can be attached to the peripheries of discs 46 and members 48 to supply desirable rigidity and strength. The arcuate crop severing members 48 can be aligned. Alternatively, adjacent members 48, which join adjacent pairs of discs 46, can be angularly staggered about drive shaft 34, for example spiraled about the longitudinal axis of drive shaft 34 as depicted in FIG. 3**.

As the crop harvesting apparatus of FIGS. 3 and 4 is rotated (clockwise in FIG. 4) among crops on a crop-bearing plant, the crops are first engaged by the crop engaging portions 50 and pass along crop passage portions 52 until the crops contact crop severing edge 54, which pulls the crops from the plant. The crop harvesting apparatus **12*a* might be rotated, for example, at a speed in the range of from about 25 to about 250 revolutions per minute, depending upon the crop being harvested. The relatively heavy mature crops catch at crop severing edge 54 to cause the crops to be severed from the plant. Contrastingly, the lighter foliage and immature crops are not caught sufficiently at crop severing edge 54** to cause any significant quantity to be removed from the plant.

Once the crops have been severed, they fall from the crop harvesting apparatus 12 into crop catching basket 42, as depicted in FIG. 5. As illustrated in FIG. 5, the rotation of the crop harvesting apparatus 12 among branches, for example on a fruit tree, results in the branches being pulled on top of the crop harvesting apparatus so that crops hanging beneath the branches are contacted and severed from the tree. This is particularly advantageous with trees having low-lying branches hanging close to or on the ground, such as orange trees.

FIG. 6 depicts a second embodiment of crop harvesting apparatus **12*b* in accordance with the present invention. Again, elongated rotatable drive shaft 34 has a plurality of support members such as discs 46 mounted at intervals. A plurality of crop severing rods 56 joins each pair of adjacent discs 46, with the rods 56 mounted to the discs 46 adjacent the edges of the discs. Although the rods 56 could all be aligned between the various discs 46, preferably they are angularly staggered about drive shaft 34 so that two adjacent rods 56 are not in alignment. By way of example, if a crop harvesting apparatus 12*b* is provided in which a first set of two rods 56 are provided between a first pair of adjacent discs 46, and are angularly positioned 180° apart about drive shaft 34, then the adjacent pair of rods 56 between the adjacent pair of discs 46 might be angularly positioned 90° apart about drive shaft 34 from those of the first set, as illustrated in FIG. 6. In such case, each rod 56 can have its longitudinal axis substantially parallel with the longitudinal axis of elongated drive shaft 34. As another example, as depicted in FIG. 7, a crop harvesting apparatus 12*c* can be provided having, for example, three substantially continuous crop severing rods 57 mounted on the discs 46, with the rods 57 slightly angularly spiraled about the longitudinal axis of elongated rotatable drive shaft 34. By way of example, each rod 57 might be angularly spiraled so that rather than being aligned, its points of contact with the edges of the adjacent discs 46 are offset in the order of one inch around the perimeter of disc 46 for each foot of drive shaft 34. As crop harvesting apparatus 12*b* or 12*c* rotates among the crops on a crop-bearing plant, the crops contact the rods 56 or 57. The angular staggering or spiraling of the rods about drive shaft 34 increases the contact between the crops and a rod 56 or 57, thereby speeding the harvesting operation. During operation, for example in a fruit tree, the mature fruit, being relatively heavy, drapes over a rod 56 or 57. As the crop harvesting apparatus 12*b* or 12*c* continues to rotate, the rods 56 or 57 sever the fruit from the tree. Foliage and immature green fruit, being lighter, do not drape over the rods 56 or 57, sufficiently to be severed from the tree. Consequently, the crop harvesting apparatus of FIGS. 6 and 7** are particularly suitable for the harvesting of mature crops without the removal of foliage or immature crops from the trees.

FIG. 8 illustrates a preferred form of construction of the crop harvesting apparatus **12*c*. Rotatable drive shaft 34 preferably includes a metal bar 58, such as a steel bar having a diameter in the order of 1 inch. Each disc 46 can be formed of a metal plate 60, for example a 16 gauge steel plate, with a metal wire 62, for example a one-fourth inch steel wire, wrapped around and welded to its periphery. The discs 46 might be circular, as depicted in FIG. 7, or they might be any other desired shape such as oval or triangular. The crop severing rods 57 include a metal rod 64 such as a threeeights inch steel rod welded to wire 62 with the weld material 65 joining rod 64 to plate 60. Once all of the metal components 58, 60, 62, 64 and 65 are assembled for the entire crop harvesting apparatus 12, the entire apparatus is provided with a coating 66 of an impact absorbing material such as a non-woven glass fiber material or an elastomeric material, for example a relatively hard rubber. Coating 66 prevents the crop harvesting apparatus 12***c* from causing damage to the bark on the tree limbs as crops are harvested. Coating 66 can be applied, for example, by spraying. Likewise, any of the crop harvesting apparatus 12 of the present invention are preferably coated with such an impact absorbing coating.

FIG. 9 depicts a slightly modified embodiment of crop harvesting apparatus 12*d* in accordance with the present invention in which discs 46 mount wavy rods 94 to rotatable drive shaft 34. Rods 94 have a slightly sinesoidal configuration, causing them to more firmly engage crops so that the crops are severed with crop harvesting apparatus 12*d* rotating more slowly than, for example, crop harvesting apparatus 12*b*. This assures that minimal damage is done to the crop-bearing plant. FIG. 10 depicts another slightly modified embodiment of a crop harvesting apparatus 12*e* in accordance with the present invention in which each end 96 of each crop severing rod 98 is bent inwardly to connect to rotatable drive shaft 34 so that, rather than discs 46, these ends 96 are the support members for rods 98.

FIG. 11 depicts a further embodiment of crop harvesting apparatus 12*f* in accordance with the present invention. One end of each of a first set of rods 100 is attached by support disc 102 to outer rotatable drive shaft 104, while the other end of each rod 100 is attached by support disc 106 to outer rotatable shaft 108. A second set of rods 110 is attached by support discs 112 to inner rotatable shaft 114. Pulley 16 is attached to outer rotatable shaft 104. Inner rotatable shaft 114 passes through outer rotatable shaft 104, within which it is suitably journaled, and pulley 118 is connected to this end of shaft 114. The second end of shaft 114 is suitably journaled within shaft 108. To harvest crops with crop harvesting apparatus 12*f*, pulley 116 is driven at a first, relatively low, rotation speed, for example, a speed in the order of 25 revolutions per minute, rotating rods 100 at that speed. Simultaneously, pulley 118 is driven at a second, faster rotation speed, for example, a speed in the order of 200 revolutions per minute, rotating rods 110 at that speed. As crop harvesting device 12*f* is thrust among the branches of a crop-bearing tree, in the manner depicted in FIG. 5, outer foliage-lifting rods 100 rotate to lift the branches. Some crops might be severed by rods 100. Primarily, the crops hang down within the arc described by rotation of foliage-lifting rods 100 and are contacted by crop-severing rods 110. Since crop-severing rods 110 are rotating at a relatively high speed, they sever the crops. With each rotation of slower rotating foliage-lifting rods 100, the branches of the crop-bearing plant move or shake to insure that all the crops hang down to contact crop-severing rods 110. This embodiment of crop harvesting apparatus 12*f* is particularly advantageous in the harvesting of crops which cling to the branches with appreciable force, such as ripe, mature Valencia oranges. In addition, because the green, immature Valencia oranges of the new crop are relatively light weight, they remain lifted away from crop-severing rods 100, along with the branches, leaves, and other foliage.

If desired offset rods such as depicted in FIG. 6, spiralled rods such as depicted in FIG. 7, or wavy rods, for example of the sinesoidal configuration of rods 94 in FIG. 9, could be utilized as either foliage-lifting rods 100 or crop-severing rods 110 or both. Likewise, FIG. 12 depicts a crop harvesting apparatus 12*g* in which crop severing rods 110 have been replaced by arcuate crop severing members 48 similar to those depicted on crop harvesting apparatus 12*a* of FIGS. 3 and 4. While ordinarily rotatable shafts 104 and 114 are driven to rotate rods 100 and 110 in the same direction, if desired the shafts 104 and 114 could be driven to rotate the rods in opposite directions. Foliage-lifting rods 100 are radially outwardly from the crop-severing rods 110, and as one illustration, for harvesting oranges, support discs 102 might have a diameter in the order of fourteen inches while support discs 112 might have a diameter in the order of 10 inches. Crop harvesting device 12*f* might have a length in the order of about 5 to about 8 feet or more. While FIG. 11 depicts crop harvesting device 12*f* with the three foliage-lifting rods 100 and three crop-severing rods 110, any number may be provided which is effective in the harvesting of the particular tree-borne crops of interest. If desired, rather than providing separate driving pulleys 116 and 118 for shafts 104 and 114, a single driving pulley or sprocket together with appropriate gearing might be utilized. The particular length, diameters, rotation speeds and number of rods utilized can be varied as desired according to the particular crop being harvested, the harvesting conditions, and the wishes of the operator.

FIGS. 13–15 illustrate a slightly modified embodiment of crop harvesting apparatus 12*h* in accordance with the present invention. Again, foliage-lifting rods 100 are attached between support disc 102, which is connected to outer rotatable drive shaft 104, and support disc 106, which is connected to outer shaft 108. Brace 109 is provided midway between disc 102 and disc 106. A first cylinder 111 is attached by a plate or spider member 113 to inner rotatable shaft 114 between disc 102 and brace 109. A second cylinder 115 is likewise attached by a similar plate or spider member 113 to inner rotatable shaft 114 between brace 109 and disc 106. Crop severing rods 110 extend longitudinally along the exterior surface of each cylinder 111 and 115. Rods 110 might be substantially straight, spiralled, wavy, or any other desired configuration. Pulley 116 is attached to outer rotatable shaft 104. Inner rotatable shaft 114 passes through outer rotatable shaft 104, within which it is suitably journaled, and pulley 118 is connected to this end of shaft 114. The second end of shaft 114 is suitably journaled within shaft 108. Preferably, as seen in FIGS. 14 and 15, each foliage-lifting rod 100 includes an inner, strengthened rod 101, of for example, steel, encircled by a resilient material layer 103 which fits loosely enough to rotate about rod 101. Layer 103 might be a plastic or glass fiber material, for example. Layer 103 rotates about rod 101 and provides sufficient resiliency to avoid damaging the foliage as it is lifted.

As seen from FIGS. 14 and 15, brace 19 is disposed between cylinders 111 and 115 and is journaled from drive shaft 114 by bearing assembly 117. Crop-severing rods 110 are not fastened to brace 109. but foliage-lifting rods 100 are fastened to brace 109. Consequently, when pulley 116 is driven, disc 102 rotates to rotate foliage-lifting rods 100, disc 106, and brace 109, while when pulley 118 is driven, cylinder 111 and crop-severing rods 110 rotate.

Operation of the embodiment of FIGS. 13–15 is similar to operation of the embodiments of FIGS. 11 and 12. Pulley 116 is driven at a first, relatively low, rotation speed to lift branches, leaves and immature fruit. Simultaneously, pulley 118 is driven at a second, faster rotation speed to sever mature crops contacting crop-severing rods 110. Cylinders 111 and 115, which are rotating with pulley 118, aid in directing the severed crops to crop catching basket 42.

Yet another embodiment of crop harvesting apparatus **12*i* is depicted in FIGS. 16, 17, 18 and 19. End plates 120 and 122 are mounted on drive shaft 124 for rotation therewith. One end of drive shaft 124 extends beyond end plate 122 to rotatably pass through a mounting member 35 to pulley 36*a*. The other end of drive shaft 124 extend through end plate 120. A second drive shaft 128 is rotatably mounted on this end of drive shaft 124 by means of bearing assembly 130. Drive shaft 128 rotatably passes through another mounting member 35 to pulley 36*b*. Gear 134 is mounted on drive shaft 128** for rotation therewith.

A plurality of foliage-lifting rods 136 extend between end plates 120 and 122, attached to the end plates adjacent the peripheries thereof and substantially equally spaced angularly about the circumferences thereof. Each rod 136 is encircled by a resilient material layer 137 which fits loosely enough to rotate about rod 136. Layer 137 might be a plastic or glass fiber material, for example. A like plurality of drive shafts 138 pass between end plates 120 and 122, being rotatably mounted on the end plates by journal members 140. After passing through end plate 120, each rotatable drive shaft 138 connects to a gear 142. Each gear 142 meshes with gear 134. In the illustrative showing of FIGS. 16–19, two crop-severing rods 144 are mounted by support rods 148 to each drive shaft 138 for rotation therewith in an arc radially inwardly on end plates 120 and 122 from foliage-lifting rods 136. Preferably, the two crop-severing rods 144 of each set are mounted substantially 180° apart about the axis of their associated drive shaft 138. Thus, as drive belt **38*b* rotates pulley 36*b*, gear 134 causes gears 142 to rotate drive shafts 138 and crop-severing rods 144. Preferably, as depicted in FIG. 19, each foliage-lifting rod 136 is mounted on each of end plates 120 and 122 at a point slightly angularly offset from the point X at which the circumference of the end plate is intersected by the end plate radius which passes through the drive shaft 138 of the crop-severing rods 144 associated with that foliage-lifting rod 136. Thus, preferably if drive belt 38*a* causes end plates 120 and 122 and foliage-lifting rods 136 to rotate counterclockwise and drive belt 38*b* causes crop-severing rods 144 to rotate counterclockwise with respect to end plates 120 and 122, the foliage-lifting rods 136 are mounted on end plates 120 and 122 at points slightly offset clockwise from their associated points X. Therefore, during rotation of crop harvesting apparatus 12*i*, each rod 136 trails its associated set of crop-severing rods 144.**

By way of illustration, end plates 120 and 122 might have diameters in the order of 15 inches; crop harvesting device **12*i* might have a length in the order of 8 feet; each drive shaft 138 might be mounted a distance in the order of 5 inches from drive shaft 124; support rods 146 might mount each crop-severing rod 144 a distance in the order of 2½ inches from its associated drive shaft 138; and each foliage-lifting rod 136 might be attached to end plates 120 and 122 a distance in the order of 1⅝ inches from its associated points X. Belt 38*a* can be driven to rotate end plates 120 and 122 at a speed in the range of from about 10 to about 75 and preferably about 25 revolutions per minute, while belt 38*b* can be driven to rotate rods 144 at a speed in the range of from about 100 to about 1000, preferably from about 400 to about 600 and more preferably about 500, revolutions per minute. As crop harvesting apparatus 12*i* is thrust into the foliage of a crop bearing plant, foliage-lifting rods 136 will life leaves, branches, immature crops and other foliage, while mature crops being heavier, will hang down to contact and to be severed by crop-severing rods 144. Foliage contacting rods 136 rotates with layers 137, thereby avoiding damage to the foliage. FIGS. 16, 17, and 18 depict four rods 136, drive shafts 138, journals 140, gears 142, sets of rods 146 and sets of rods 144; however, any desired number could be provided. Likewise, sprockets and a chain or pulleys and a belt could be utilized in place of gears 134 and 142, and sprockets and chains could be utilized in place of pulleys 36*a* and 36*b* and belts 38*a* and 38*b*.**

FIGS. 20 and 21 depict a slightly modified embodiment of crop harvesting apparatus **12*j* in which there are added to the apparatus 12*i* of FIGS. 16–19 an additional set of rods 139 extending between end plates 120 and 122, with one rod 139 being positioned at a point substantially equally distanced angularly between each pair of drive shafts 138 and substantially one-fourth to one-half the distance between drive shaft 124 and the peripheral edge of plates 120 and 122. Rods 139 aid in directing severed crops into crop catching baskets 42** and thus are designated crop directing rods.

FIG. 22 depicts an embodiment of crop harvesting apparatus **12*k* which differs from apparatus 12*i* of FIGS. 16–19 in that crop-severing rods 144 are mounted longitudinally on the exterior surfaces of cylinders 145 rather than directly on rods 146. Again, rods 144 might be straight, spiralled, wavy, or any other desired configuration. Cylinders 145, in turn, are mounted by spiders or other suitable means to drive shafts 138 which are driven by gears 142. If desired, a center brace can be provided for foliage-lifting rods 136.**

FIG. 23 illustrates a crop catching basket 42. Cross member 66 is connected between the two lower horizontal members 32. Basket 42 includes two vertical side members 68, each suspended from a lower horizontal member 32 and terminating in a bottom edge member 70. Each bottom edge member 70 hingedly supports a bottom plate member 72. Basket 42 further includes a vertical front surface member and a vertical rear surface member 74. From approximately the center of each bottom plate member 72, a piston 76 extends to cross member 66. In the withdrawn position of pistons 76, the bottom plates 72 are drawn up in the solid line position of FIG. 21, placing basket 42 in a closed, crop-retaining position. With the pistons 76 extended, the bottom plates 72 swing downwardly, as illustrated in the broken line position of FIG. 21, placing basket 42 in an opened, crop-releasng position in which the crops fall from basket 42. The control for pistons 76 is provided on control panel 20. Thus, once sufficient crops have been harvested to fill basket 42 to a desired level, boom 24 is rotated to position basket 42 over a receiving area such as the bed of a truck or a loading platform. Pistons 76 are then actuated to open bottom members 72, permitting the crops to pass from the interior of basket 42 to the receiving area.

As illustrated in FIG. 2, the coupling between boom 24 and support member 28 includes a universal joint 78, which permits rotation of support station 10 in any desired manner. The desired orientation of support station 10 with respect to boom 24 depends upon the angle at which boom 24 is extended. Preferably, support station 10 is maintained substantially horizontal during the crop harvesting operation. Level sensing devices 80, which are mounted on vertical frame member 30 are provided to aid this.

FIG. 24 illustrates a suitable level sensing device 80. As there shown, a pendulum member 82 is suspended from pivot 84. As support station 10 varies from a horizontal position, pendulum member 82 swings so that it remains substantially vertically oriented from pivot 84. Disc member 86 is mounted to rotate with pendulum member 82 about pivot 84. Contact member 88 extends from disc member 86. A contact member 90 is mounted on each side of contact member 88 without touching the contact member 88 in the position assumed by pendulum member 82 when support station 10 is substantially horizontal. Should the orientation of support station 10 deviate from the horizontal, pendulum member 82 swings about pivot 84 to remain substantially vertically oriented. This causes contact member 88 to close against one of the contact members 90, providing electrical continuity to actuate a level adjusting device for basket 42. This level adjusting device is actuaed until support station 10 is returned to a substantially horizontal orientation. As seen in FIG. 3, two level sensing devices 80 are provided, with one level sensing device 80 sensing deviations from the horizontal in one vertical plane and the other level sensing device 80 sensing deviation from the horizontal in a second vertical plane at a right angle with the first vertical plane. Suitable level adjusting devices such as piston 92 are provided adjacent universal joint 78 to permit leveling of support station 10 in any orientation relative to boom 24 and in response to level sensing devices 80 so that support station 10 can be maintained substantially horizontal.

FIGS. 25, 26, 27 and 28 depict a further embodiment of crop harvesting apparatus **12*m*. A first endless belt 148 is mounted about cylinders 150 and 152. Cylinder 150 is supported by spider 113 from drive shaft 114. Cylinder 152 is supported by spider 113 from rotatable shaft 154. Crop severing rods 110 ae mounted on the surface of the endless belt 148. A pair of pulleys 156 are mounted on one end of shafts 114 and 154, being suitably journeled on those shafts so that they do not rotate with the shafts. An endless cable 158 travels about pulleys 156. A second pair of pulleys 156 is provided on shafts 114 and 154 at the other side of endless belt 148, with a second endless cable 158 traveling thereabout. Another endless belt 160 extends from the other side of this second pair of pulleys 156, being mounted on cylinders similar to cylinders 150 and 152. Further crop severing rods 110 are supported on the surface of endless belt 160. A third set of pulleys 156, with a third endless cable 158 thereabout, is provided adjacent the second side of this second endless belt 160, on the other ends of shafts 114 and 154. Foliage-lifting rods 100 extend between the outermost endless cables 158, and so extend across the width of both endless belt 148 and endless belt 160. The intermediate endless belt 158 provides support at the midpoint for foliage-lifting rods 100. One of the pulleys 156 is suitably driven by a drive shaft coaxial with drive shaft 114. Drive shaft 114 and pulleys 156 either are driven from the same side of crop harvesting apparatus 12*m*, in a manner similar to that utilized with crop harvesting apparatus 12*h* of FIGS. 13, 14 and 15, or are driven from opposite sides, in a manner similar to that utilized with crop harvesting apparatus 12*i* of FIG. 17. The pulleys 156 are of a greater diameter than cylinders 150 and 152 and endless belts 148 and 160, so that foliage lifting rods 100 move in a path overlying, outwardly of, and parallel to the path of travel of crop severing rods 110.**

An arcuate shield 162 extends around substantially the lower half of the forward curvature of endless belts 148 and 160, lying between foliage-lifting rods 100 and crop severing rods 110. During trael of crop severing rods 110 around that lower half of the front curvature of endless belts 148 and 160, shield 162 assumes that crops are not severed from the crop-bearing plant by the crop severing rods, since crops severed a such location would likely fall to the ground rather than into crop catching basket 42.

FIG. 29 depicts a still further embodiment of crop harvesting apparatus **12*n*, similar to crop harvesting apparatus 12*h* of FIGS. 13, 14 and 15. Crop harvesting apparatus 12*n* has a shield 162 similar to shield 162 of crop harvesting apparatus 12*m* of FIGS. 25, 26, 27 and 28 extending around substantially the lower front quarter of the periphery of cylinders 111 and 115, and lying between the rotational paths of travel of crop severing rods 110 and foliage lifting rods 100. As seen in FIG. 30, shield 162 is fastened at each of its ends by a brace member 164 which attaches to bearing assembly 117. The bearing assembly 117 associated with end plate 102 extends through that end plate, as depicted in FIG. 29. Consequently, that bearing assembly 117 can be attached, for example, to a mounting member 35 to assure that shield 162 does not rotate. The shield 162 of crop harvesting apparatus 12*m*** can be likewise held from rotation.

Two crop harvesting apparatus **12*m* can be mounted at the end of a boom 24 adjacent a crop catching basket 42, as depicted in FIG. 28. These crop harvesting apparatus 12*m* then can be inserted into the crop bearing plant to remove crops therefrom. The crops will be transported across the upper surface of each endless belt 148 and 160 to be deposited into crop catching basket 42. If desired, horizontal frame members 32 can be telescoping members such as illustrated in FIG. 31 by telescoping frame member 33 which slidably engages vertical frame members 30, so that one or both of the crop harvesting apparatus 12*m* can extend forward from crop catching basket 42** for insertion further into the crop bearing plant.

In the harvesting of crops with the crop harvesting apparatus 12 as depicted in FIG. 5, preferably crop harvesting station 10 is moved horizontally into and among the foliage of a crop-bearing plant, and then is swept inwardly, upwardly and outwardly in an arcuate path such as described by arrow 95 in FIG. 5 so as to contact substantially all of the crops on the plant. Alternatively, if a support station 10 is equipped with a larger number of crop harvesting apparatus 12, for example, with four such apparatus, a straight thrust into the tree might be sufficient to contact and remove all the fruit without an arcuate sweep. It has been found that the crop harvesting apparatus in accordance with the present invention results in the harvesting of crops without the removal of any significant amount of foliage from the plant. In addition, the crop harvesting apparatus in accordance with the present invention has been found capable of severing from a Valencia orange tree the mature, ripened fruit, while leaving the immature, green fruit of the new crop on the tree. The crop harvesting apparatus is suitable for harvesting of other crops, including nuts and other fruit crops such as apples and peaches. While dimensions and rotation speeds have been suggested in the above illustrative examples, these are only representative of crop harvesting apparatus in accordance with the present invention, for example, for use in the harvesting of fruit such as oranges, and other dimensions and speeds might be utilized, depending upon the operator's preference and upon the particular crop to be harvested. If an easily bruised fruit, such as some varieties of apples or peaches, is to be harvested, crop catching basket 42 can be lined with a soft material such as foam rubber to prevent bruising. For more rapid harvesting, vehicle 14 might include two or more booms 24, each with a support station 10 having several crop harvesting apparatus 12. Although the present invention has been described with reference to preferred embodiments, numerous modifications and rearrangements might be made, and still the result would come within the scope of the invention.

What is claimed is:

1. A crop harvesting apparatus comprising an elongated rotatable drive shaft; a plurality of support members mounted on the rotatable drive shaft; a plurality of crop severing means mounted on the support members to join each pair of adjacent support members; a support station; mounting means for rotatably mounting the rotatable drive shaft on the support station; drive means coupled to the rotatable drive shaft for rotatably driving the rotatable drive shaft; a self-propelled vehicle; an extendible boom having a first end rotatably mounted on the self-propelled vehicle and a second end connected to the support station; control means mounted on the self-propelled vehicle for controlling the movement of the crop harvesting apparatus; level sensing means connected to the support station for sensing in each of two mutually perpendicular vertical planes the orientation with respect to horizontal of the support station; and level adjusting means responsive to the level sensing means for adjusting in said vertical planes the orientation with respect to horizontal of the support station.

2. A crop harvesting apparatus as claimed in claim 1 further comprising a crop catching basket connected to the support station for catching crops severed by the crop severing means.

3. A crop harvesting apparatus as claimed in claim 2 in which the crop catching basket includes at least one hingedly attached member and means for moving said hingedly attached member from a closed, crop-retaining position to an opened, crop-releasing position.

4. A crop harvesting apparatus as claimed in claim 1 in which the drive shaft, the support members and the crop severing means are coated with an impact absorbing material.

5. A crop harvesting apparatus as claimed in claim 4 in which the impact absorbing material is a non-woven glass fiber material.

6. A crop harvesting apparatus as claimed in claim 4 in which the impact absorbing material is an elastomeric material.

7. A crop harvesting apparatus as claimed in claim 6 in which the elastomeric material is rubber.

8. A crop harvesting apparatus comprising crop severing means; a self-propelled vehicle; an extendible boom mounting said crop severing means on said self-propelled vehicle; control means for controlling said crop severing means, said self-propelled vehicle and said extendible boom to control the movement of the crop harvesting apparatus; level sensing means connected to said crop severing means for sensing in each of two mutually perpendicular vertical planes the orientation with respect to horizontal of said crop severing means; and level adjusting means connected to said crop severing means and responsive to said level sensng means for adjusting in said vertical planes the orientation with respect to horizontal of said crop severing means.

9. A crop harvesting apparatus comprising a first elongated rotatable drive shaft; a first plurality of support members mounted on the first rotatable drive shaft; a plurality of arcuate crop severing members mounted on the first plurality of support members to join each pair of adjacent ones of the first plurality of support members, each arcuate crop severing member having a crop engaging portion and a crop passage portion terminating in a crop severing edge, a second rotatable drive shaft coaxial with the first elongated rotatable drive shaft; a second plurality of support members mounted on the second rotatable drive shaft; and a plurality of foliage lifting rods mounted on the second plurality of support members radially outwardly of the arcuate crop severing members to join each pair of adjacent ones of the second plurality of support members.

10. A crop harvesting apparatus as claimed in claim 9 in which the first plurality of support members comprise circular discs and in which the arcuate crop severing members are mounted on the disc peripheries.

11. A crop harvesting apparatus as claimed in claim 9 in which each pair of adjacent ones of the first plurality of support members is joined by two arcuate crop severing members.

12. A crop harvesting apparatus as claimed in claim 9 in which the arcuate crop severing members joining adjacent pairs of the plurality of support members are staggered about the first elongated rotatable drive shaft longitudinal axis.

13. A crop harvesting apparatus as claimed in claim 9 in which each crop passage portion is more narrow than its associated crop engaging portion.

14. A crop harvesting apparatus as claimed in claim 9 including means rotatably supporting the first drive shaft within the second drive shaft for rotation with respect thereto.

15. A crop harvesting apparatus comprising a first elongated rotatable drive shaft; first support means mounted on the first rotatable drive shaft; a first plurality of crop severing rods mounted on the first support means with the first plurality of crop severing rods spaced from the first drive shaft; a second rotatable drive shaft coaxial with the first elongated rotatable drive shaft; a plurality of support members mounted on the second rotatable drive shaft; and a plurality of foliage-lifting rods mounted on the plurality of support members radially outwardly of the first plurality of crop severing rods to join each pair of adjacent ones of the plurality of support members.

16. A crop harvesting apparatus as claimed in claim 15 in which the first support means comprises a first plurality of support members and in which the first plurality of crop severing rods are mounted on the first plurality of support members to join each pair of adjacent support members.

17. A crop harvesting apparatus as claimed in claim 16 in which the support members are circular discs and in which the crop severing rods are mounted to the first plurality of support member circular disc adjacent the disc peripheries and in which the foliage-lifting rods are mounted to the second plurality of support member circular discs adjacent the disc peripheries.

18. A crop harvesting apparatus as claimed in claim 16 in which each pair of adjacent support members is joined by two rods.

19. A crop harvesting apparatus as claimed in claim 16 in which each pair of adjacent support members is joined by two crop severing rods angularly positioned in the order of 180° apart about the rotatable drive shaft.

20. A crop harvesting apparatus as claimed in claim 16 having in the first plurality of support members at least three support members groupable in at least two pairs of adjacent support members.

21. A crop harvesting apparatus as claimed in claim 20 in which the crop severing rods joining adjacent pairs of support members are angularly positioned 90° apart about the rotatable drive shaft.

22. A crop harvesting apparatus as claimed in claim 20 in which the crop severing rods joining adjacent pairs of support members are angularly staggered about the rotatable drive shaft.

23. A crop harvesting apparatus as claimed in claim 16 in which each pair of adjacent support members of the first plurality of support members is joined by three crop severing rods.

24. A crop harvesting apparatus as claimed in claim 16 in which each pair of adjacent support members of the first plurality of support members is joined by three crop severing rods angularly positioned in the order of 120° apart about the first rotatable drive shaft.

25. A crop harvesting apparatus as claimed in claim 15 in which each crop severing rod of the first plurality of crop severing rods is angularly spiraled about the rotatable drive shaft longitudinal axis.

26. A crop harvesting apparatus as claimed in claim 15 in which each crop severing rod of the first plurality of crop severing rods is mounted with the crop severing rod longitudinal axis substantially parallel with the longitudinal axis of the first elongated rotatable drive shaft.

27. A crop harvesting apparatus as claimed in claim 15 in which each crop severing rod of the first plurality of crop severing rods has a wavy configuration.

28. A crop harvesting apparatus as claimed in claim 27 in which the crop severing rods have a sinesoidal configuration.

29. A crop harvesting apparatus as claimed in claim 15 including means rotatably supporting the first drive shaft within the second drive shaft for rotation with respect thereto.

30. A crop harvesting apparatus as claimed in claim 15 including first drive means for rotating the first elongated rotatable drive shaft and second drive means for rotating the second rotatable drive shaft.

31. A crop harvesting apparatus as claimed in claim 30 in which the first and second drive means drive the first and second drive shafts in the same direction.

32. A crop harvesting apparatus as in claim 15 in which each foliage lifting rod is enclosed in a rotatable resilient layer.

33. A crop harvesting apparatus comprising a first elongated rotatable drive shaft; cylinder means encircling said first rotatable drive shaft; spider means attaching said cylinder means to said first rotatable drive shaft for rotation therewith; a plurality of crop severing rods mounted on the exterior surface of said cylinder means to extend longitudinally therealong; a second rotatable drive shaft coaxial with said first elongated rotatable drive shaft; a plurality of support members mounted on said second rotatable drive shaft; and a plurality of foliage-lifting rods mounted on said plurality of support members radially outwardly of said crop severing rods to join each pair of adjacent ones of said plurality of support members.

34. A crop harvesting apparatus as claimed in claim 33 including means rotatably supporting the first drive shaft within the second drive shaft for rotation with respect thereto.

35. A crop harvesting apparatus as claimed in claim 33 further comprising arcuate shield means journalled on one of the rotatable shafts and extending around substantially the lower front quarter of the periphery of the cylinder means for shielding crop severing rods during passage of the crop severing rods around the lower front quarter of the cylinder means.

36. A crop harvesting apparatus as claimed in claim 8 in which the arcuate shield means is positioned between the path of travel of the crop severing rods and the path of travel of the foliage lifting rods.

37. A crop harvesting apparatus comprising a first elongated rotatable drive shaft; first support means mounted on the first rotatable drive shaft; a first plurality of crop severing rods mounted on the first support means with the first plurality of crop severing rods spaced from the first drive shaft; a second elongated rotatable drive shaft; second support means mounted on the second rotatable drive shaft; and a second plurality of crop severing rods mounted on the second support means, with the second plurality of crop severing rods spaced from the second drive shaft; a third rotatable drive shaft; a first plurality of support members mounted on the third rotatable drive shaft; and a plurality of foliage lifting rods mounted on the first plurality of support members to join each pair of adjacent ones of the first plurality of support members; the first plurality of support members rotatably supporting the first and second elongated rotatable drive shafts for rotating all the crop severing rods radially inwardly of the plurality of foliage lifting rods.

38. A crop harvesting apparatus as claimed in claim 37 further comprising a plurality of crop directing rods mounted on the first plurality of support members to join each pair of adjacent ones of the first plurality of support members.

39. A crop harvesting apparatus as claimed in claim 38 in which each crop directing rod is mounted substantially equally distanced angularly between two adjacent foliage lifting rods.

40. A crop harvesting apparatus as claimed in claim 39 in which each crop directing rod is mounted at a point from about one-fourth to one-half the distance between the third rotatable drive shaft and the peripheries of its associated ones of the first plurality of support members.

41. A crop harvesting apparatus as claimed in claim 37 including first drive means for rotating the third rotatable drive shaft and second drive means for rotating the first and second rotatable drive shafts.

42. A crop harvesting apparatus as claimed in claim 41 in which the first and second drive means rotate the first, second and third drive shafts in the same angular direction.

43. A crop harvesting apparatus as claimed in claim 42 in which each support member is substantially circular and in which the foliage lifting rods are mounted on the first plurality of support members at points angularly offset from the points at which the radii on the first plurality of support members passing through the first and second elongated rotatable drive shafts intersect the circumferences of the first plurality of support members.

44. A crop harvesting apparatus as claimed in claim 37 in which:

the first support means comprises a first cylinder encircling the first rotatable drive shaft and a first spider member attaching the first cylinder to the first rotatable drive shaft for rotation therewith;

the first plurality of crop severing rods extend longitudinally along the exterior surface of the first cylinder;

the second support means comprises a second cylinder encircling the second rotatable drive shaft and a second spider member attaching the second cylinder to the second rotatable drive shaft for rotation therewith; and the second plurality of crop severing rods extend longitudinally along the exterior surface of the second cylinder.

45. A crop harvesting apparatus as claimed in claim 37 in which:

the first support means comprises a second plurality of support members;

the first plurality of crop severing rods are mounted on the second plurality of support members to join each pair of adjacent support members of the second plurality of support members;

the second support means comprises a third plurality of support members; and the second plurality of crop severing rods are mounted on the third plurality of support members to join each pair of adjacent support members of the third plurality of support members.

46. A crop harvesting apparatus as claimed in claim 42 further comprising a fourth elongated rotatable drive shaft, a third support means mounted on the fourth rotatable drive shaft, and a third plurality of crop severing rods mounted on the third support means, with the third plurality of crop severing rods spaced from the fourth drive shaft, and in which the fourth elongated rotatable drive shaft is rotatably mounted on the first plurality of support members for rotating the third plurality of crop severing rods radially inwardly of the plurality of foliage lifting rods, and in which the second drive means rotates the fourth elongated rotatable drive shaft.

47. A crop harvesting apparatus as claimed in claim 46 in which:

the first support means comprises a first cylinder encircling the first rotatable drive shaft and a first spider member attaching the first cylinder to the first rotatable drive shaft for rotation therewith;

the first plurality of crop severing rods extend longitudinally along the exterior surface of the first cylinder;

the second support means comprises a second cylinder encircling the second rotatable drive shaft and a second spider member attaching the second cylinder to the second rotatable drive shaft for rotation therewith;

the second plurality of crop severing rods extend longitudinally along the exterior surface of the second cylinder;

the third support means comprises a third cylinder encircling the fourth drive shaft and a third spider member attaching the third cylinder to the fourth rotatable drive shaft for rotation therewith; and the third plurality of crop severing rods extend longitudinally along the exterior surface of the third cylinder.

48. A crop harvesting apparatus as claimed in claim 46 in which:

the first support means comprises a second plurality of support members;

the first plurality of crop severing rods are mounted on the second plurality of support members to join each pair of adjacent support members of the second plurality of support members;

the second support means comprises a third plurality of support members;

the second plurality of crop severing rods are mounted on the third plurality of support members to join each pair of adjacent support members of the third plurality of support members;

the third support means comprises a fourth plurality of support members; and the third plurality of crop severing rods are mounted on the fourth plurality of support members to join each pair of adjacent support members of the fourth plurality of support members.

49. A crop harvesting apparatus as claimed in claim 46 further comprising a fifth elongated rotatable drive shaft, a fourth support means mounted on the fifth rotatable drive shaft, and a fourth plurality of crop severing rods mounted on the fourth support means, with the fourth plurality of crop severing rods spaced from the fifth drive shaft, and in which the fifth elongated rotatable drive shaft is rotatably mounted on the first plurality of support members for rotating the fourth plurality of crop severing rods radially inwardly of the plurality of foliage lifting rods, and in which the second drive means rotates the fifth elongated rotatable drive shaft.

50. A crop harvesting apparatus as claimed in claim 49 in which:

the first support means comprises a first cylinder encircling the first rotatable drive shaft and a first spider member attaching the first cylinder to the first rotatable drive shaft for rotation therewith;

the first plurality of crop severing rods extend longitudinally along the exterior surface of the first cylinder;

the second support means comprises a second cylinder encircling the second rotatable drive shaft and a second spider member attaching the second cylinder to the second rotatable drive shaft for rotation therewith;

the second plurality of crop severing rods extend longitudinally along the exterior surface of the second cylinder;

the third support means comprises a third cylinder encircling the fourth rotatable drive shaft and a third spider member attaching the third cylinder to the fourth rotatable drive shaft for rotation therewith;

the third plurality of crop severing rods extend longitudinally along the exterior surface of the third cylinder;

the fourth support means comprises a fourth cylinder encircling the fifth rotatable drive shaft and a fourth spider member attaching the fourth cylinder to the fifth rotatable drive shaft for rotation therewith; and the fourth plurality of crop severing rods extend longitudinally along the exterior surface of the fourth cylinder.

51. A crop harvesting apparatus as claimed in claim 49 in which:

the first support means comprises a second plurality of support members;

the first plurality of crop severing rods are mounted on the second plurality of support members to join each pair of adjacent support members of the second plurality of support members;

the second support means comprises a third plurality of support members;

the second plurality of crop severing rods are mounted on the third plurality of support members to join each pair of adjacent support members of the third plurality of support members;

the third support means comprises a fourth plurality of support members;

the third plurality of crop severing rods are mounted on the fourth plurality of support members to join each pair of adjacent support members of the fourth plurality of support members;

the fourth support means comprises a fifth plurality of support members; and the fourth plurality of crop severing rods are mounted on the fifth plurality of support members to join each pair of adjacent support members of the fifth plurality of support members.

52. A crop harvesting apparatus as claimed in claim 37 further comprising a fourth elongated rotatable drive shaft, third support means mounted on the fourth rotatable drive shaft, and a third plurality of crop severing rods mounted on the third support means, with the third plurality of crop severing rods spaced from the fourth drive shaft, and in which the fourth elongated rotatable drive shaft is rotatably mounted on the first plurality of support members rotating the third plurality of crop severing rods radially inwardly of the plurality of foliage lifting rods.

53. A crop harvesting apparatus as claimed in claim 52 in which:

the first support means comprises a first cylinder encircling the first rotatable drive shaft and a first spider member attaching the first cylinder to the first rotatable drive shaft for rotation therewith;

the first plurality of crop severing rods extend longitudinally along the exterior surface of the first cylinder;

the second support means comprises a second cylinder encircling the second rotatable drive shaft and a second spider member attaching the second cylinder to the second rotatable drive shaft for rotation therewith;

the second plurality of crop severing rods extend longitudinally along the exterior surface of the second cylinder;

the third support means comprises a third cylinder encircling the fourth rotatable drive shaft and a third spider member attaching the third cylinder to the fourth rotatable drive shaft for rotation therewith; and the third plurality of crop severing rods extend longitudinally along the exterior surface of the third cylinder.

54. A crop harvesting apparatus as claimed in claim 52 in which:

the first support means comprises a second plurality of support members;

the first plurality of crop severing rods are mounted on the second plurality of support members to join each pair of adjacent support members of the second plurality of support members;

the second support means comprises a third plurality of support members;

the second plurality of crop severing rods are mounted on the third plurality of support members to join each pair of adjacent support members of the third plurality of support members;

the third support means comprises a fourth plurality of support members; and the third plurality of crop severing rods are mounted on the fourth plurality of support members to join each pair of adjacent support members of the fourth plurality of support members.

55. A crop harvesting apparatus as claimed in claim 52 further comprising a fifth elongated rotatable drive shaft, fourth support means mounted on the fifth rotatable drive shaft, and a fourth plurality of crop severing rods mounted on the fourth support means, with the fourth plurality of crop severing rods spaced from the fifth drive shaft, and in which the fifth elongated rotatable drive shaft is rotatably mounted on the first plurality of support members for rotating the fourth plurality of crop severing rods radially inwardly of the plurality of foliage lifting rods.

56. A crop harvesting apparatus as claimed in claim 55 in which:

the first support means comprises a first cylinder encircling the first rotatable drive shaft and a first spider member attaching the first cylinder to the first rotatable drive shaft for rotation therewith;

the first plurality of crop severing rods extend longitudinally along the exterior surface of the first cylinder;

the second support means comprises a second cylinder encircling the second rotatable drive shaft and a second spider member attaching the second cylinder to the second rotatable drive shaft for rotation therewith;

the second plurality of crop severing rods extend longitudinally along the exterior surface of the second cylinder;

the third support means comprises a third cylinder encircling the fourth rotatable drive shaft and a third spider member attaching the third cylinder to the fourth rotatable drive shaft for rotation therewith;

the third plurality of crop severing rods extend longitudinally along the exterior surface of the third cylinder;

the fourth support means comprises a fourth cylinder encircling the fifth rotatable drive shaft and a fourth spider member attaching the fourth cylinder to the fifth rotatable drive shaft for rotation therewith; and the fourth plurality of crop severing rods extend longitudinally along the exterior surface of the fourth cylinder.

57. A crop harvesting apparatus as claimed in claim 55 in which:

the first support means comprises a second plurality of support members;

the first plurality of crop severing rods are mounted on the second plurality of support members to join each pair of adjacent support members of the second plurality of support members;

the second support means comprises a third plurality of support members;

the second plurality of crop severing rods are mounted on the third plurality of support members to join each pair of adjacent support members of the third plurality of support members;

the third support means comprises a fourth plurality of support members;

the third plurality of crop severing rods are mounted on the fourth plurality of support members to join each pair of adjacent support members of the fourth plurality of support members;

the fourth support means comprises a fifth plurality of support members; and the fourth plurality of crop severing rods are mounted on the fifth plurality of support members to join each pair of adjacent support members of the fifth plurality of support members.

58. A crop harvesting apparatus as claimed in claim 49 in which each foliage lifting rod is enclosed in a rotatable resilient layer.

59. A crop harvesting apparatus comprising a first rotatable shaft; a second rotatable shaft; endless belt means mounted on said first and second rotatable shafts for movement in an endless path thereabout; a plurality of crop severing rods mounted on said endless belt means for movement therewith; mounting means journalled on said first and second rotatable shafts for rotation with respect thereto; endless cable means mounted on said mounting means for movement in an endless path about said first and second rotatable shafts; a plurality of foliage lifting rods mounted on said endless cable means for movement therewith in a path overlying, outwardly of, and parallel to the path of movement of said plurality of crop severing rods; first drive means for rotatably driving one of said first and second rotatable shafts to move said crop severing rods; and second driving means for driving said mounting means to move said foliage lifting rods.

60. A crop harvesting apparatus as claimed in claim 59 in which said endless cable means comprises a first endless cable mounted on one side of said endless belt means for movement parallel thereto and a second endless cable mounted on the other side of said endless belt means for movement parallel thereto.

61. A crop harvesting apparatus as claimed in claim 59 in which said endless belt means comprises first and second endless belts mounted for movement in parallel paths and in which said endless cable means comprises a first endless cable mounted on the outer side of one of said endless belts for movement in an endless path parallel thereto, a second endless cable mounted on the outer side of the other of said endless belts for movement in an endless path parallel thereto, and a third endless cable mounted intermediate said first and second endless belts for movement in an endless path parallel thereto.

62. A crop harvesting apparatus as claimed in claim 61 in which each of said foliage lifting rods extends from said first endless cable to said second endless cable and is supported at substantially its midpoint by said third endless cable.

63. A crop harvesting apparatus as claimed in claim 59 further comprising arcuate shield means journaled on one of the potatable shafts and extending around substantially the lower half of the forward curvature of said endless belt means for shielding crop severing rods during movement of the crop severing rods around the lower front curvature of said endless belt means.

64. A crop harvesting apparatus as claimed in claim 63 in which said arcuate shield means is positioned between the path of movement of said crop severing rods and the path of movement of said foliage lifting rods.

65. A crop harvesting apparatus as claimed in claim 59 further comprising a support station; mounting means for rotatably mounting the first, second, third, and fourth rotatable shafts on the support station; drive means coupled to the first and third rotatable shafts for rotatably driving said first and third rotatable shafts; a crop catching basket connected to the support station for catching crops severed by the crop severing rods; a self-propelled vehicle; an extendible boom having a first end rotatably mounted on the self-propelled vehicle and a second end connected to the support station, and control means mounted on the self-propelled vehicle for controlling the movement of the crop harvesting apparatus.

66. A crop harvesting appparatus as claimed in claim 65 in which said mounting means includes telescoping means for extending said first and third rotatable shafts forwardly of said crop catching basket.

67. A crop harvesting apparatus comprising a first rotatable drive shaft; first support means mounted on the first rotatable drive shaft; a plurality of crop severing rods mounted on the first support means with the first plurality of crop severing rods spaced from the first drive shaft; a second rotatable drive shaft; second support means mounted on the second rotatable drive shaft; and a plurality of foliage support rods mounted on the second suppot means, said first rotatable drive shaft mounted on said second support means for rotation of said crop severing rods within said foliage lifting rods.

* * * * *